United States Patent [19]

Bovee et al.

[11] Patent Number: 4,746,772
[45] Date of Patent: May 24, 1988

[54] ADJUSTABLE POSITION INDICATING APPARATUS

[75] Inventors: Loren L. Bovee; Larry L. Swartz, both of Marshalltown, Iowa

[73] Assignee: Fisher Controls International, Inc., Marshalltown, Iowa

[21] Appl. No.: 910,646

[22] Filed: Sep. 23, 1986

[51] Int. Cl.$^4$ .......................... H01H 3/00; H01H 9/00
[52] U.S. Cl. .................................... 200/17 R; 200/308
[58] Field of Search .................... 200/6 A, 6 B, 6 BB, 200/18, 27 B, 30 R, 31 R, 38 B, 38 C, 61.13, 61.18, 61.24, 61.42, 61.58 R, 61.88, 61.89, 835, 835 A, 153 G, 153 H, 153 LB, 153 T, 315, 316, 335, 336, 153 K, 47, 308

[56] References Cited

U.S. PATENT DOCUMENTS

| 2,732,450 | 1/1956 | Stevenson | 200/153 H X |
|---|---|---|---|
| 3,239,616 | 3/1966 | Rosenston | 200/47 |
| 3,540,305 | 11/1970 | Sprung | 200/83 S X |
| 3,587,959 | 6/1971 | Glover | 200/61.18 X |
| 3,649,785 | 3/1972 | Dietrich | 200/153 K X |
| 3,809,832 | 5/1974 | Burger | 200/61.13 X |
| 3,858,013 | 12/1974 | Parent | 200/61.18 X |
| 3,959,614 | 5/1976 | Graninger | 200/153 K X |
| 4,095,062 | 6/1978 | Savageau | 200/61.13 |

Primary Examiner—J. R. Scott
Attorney, Agent, or Firm—Marshall, O'Toole, Gerstein, Murray & Bicknell

[57] ABSTRACT

This disclosure relates to apparatus for use with a mechanism having at least one preselected position and for indicating whether the mechanism is at this position. The apparatus comprises a lever having an axis of rotation and which is rotatable on the axis. A cam is fastened to the lever and is rotatable with the lever, the lever and the cam being operably connected to the mechanism and to be rotated to a first angular location when the mechanism is at the preselected position. A sensor is mounted adjacent the lever and is responsive to the position of the cam.

9 Claims, 3 Drawing Sheets

ADJUSTABLE POSITION INDICATING APPARATUS

FIELD AND BACKGROUND OF THE INVENTION

This invention relates to an adjustable apparatus for indicating the position of a mechanism, such as the position of a valve plug within a valve.

There are numerous applications for an apparatus which provides an indication of the position of a mechanism operable between two or more positions. In the process control field, for example, valves are commonly used to control the flow of fluids, and operators, often located in a control room remote from the valves, must be able to quickly determine the status of a particular valve, e.g., whether it is open or closed. Accordingly, it is also common to provide apparatus resident with the valve, typically with the valve actuator, for monitoring the status of the valve and means for conveying this information to the control room. There, the operator can monitor the position of the valve at a control console or by observing indicator lights on a control panel.

Although such apparatus has been provided in the past, one shortcoming is that they have not been easily adjustable to accommodate different types of valves or variations in the travel of the valve plug required to open and close them. Such differences and variations have frequently required extensive modifications or complicated calibration of the apparatus.

It is a general object of the present invention to provide improved apparatus which avoids the above problems and is readily adjustable.

BRIEF SUMMARY OF THE INVENTION

Apparatus in accordance with the invention is responsive to the position of a mechanism having at least one preselected position, and comprises a lever having an axis and being rotatable on said axis, a cam fastened to said lever and being rotatable with said lever, said lever and said cam being adapted to be connected to said mechanism and to be rotated to a first angular location when said mechanism is at said one position, and position sensor means mounted adjacent said lever and responsive to the position of said cam, said sensor means being adapted to actuate an indicator in response to said cam being at said first angular location. An adjustable stop is engageable with said lever when at said first location, and said sensor means is adjustable relative to said cam.

BRIEF DESCRIPTION OF THE DRAWINGS

The invention will be better understood from the following detailed description taken in conjunction with the accompanying figures of the drawings, wherein.

DETAILED DESCRIPTION OF THE INVENTION

Although FIGS. 1-6 show a valve actuator having apparatus for providing valve position indication to a remote location, such as a control room, it should be understood at the outset that apparatus embodying the principles of the present invention can also be used in other applications and with mechanisms other than valves.

Figure 1:
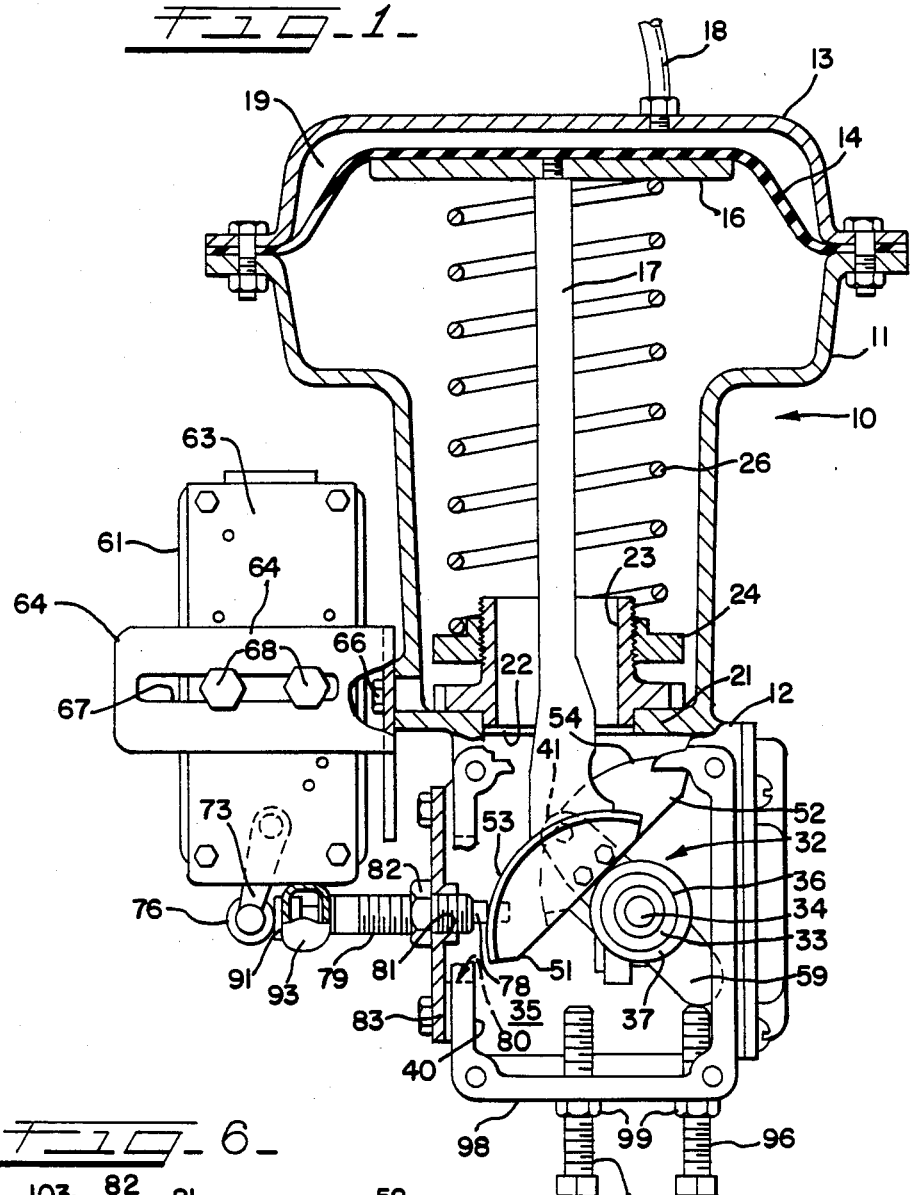
FIG. 1 is a sectional view of apparatus in accordance with the invention.

With reference to FIG. 1, an actuator housing 10 includes an upper housing portion 11 and an integral lower housing portion 12. It should be understood, however, that terms such as upper, lower, bottom, down, etc. are used herein only for convenience in describing the drawings, and that the apparatus may have other orientations before and during use. Covering the top of the upper housing portion 11 is a housing cover 13, sometimes called a diaphragm casing, and a flexible diaphragm 14 having its outer periphery sealed between the upper housing portion 11 and the housing cover 13 extends across the upper housing portion 11. A disk-shaped diaphragm plate 16 is positioned against the underside of the diaphragm and a rod 17, stamped and formed from sheet metal, is attached to and extends downwardly from the plate. Connected to the cover 13 is a supply line 18 which communicates with the space 19 between the diaphragm 14 and the cover 13 and supplies pressurized gas, such as air, to the space 19 to control the position of the diaphragm 14.

An annular shelf 21 is provided where the upper housing portion 11 joins the lower housing portion 12 to define a central opening 22. A tubular sleeve 23 positioned on the shelf 21 concentrically with the opening 22, and an adjustment ring 24 is threaded onto the outside of the sleeve 23 to hold a coiled compression spring 26 against the diaphragm plate 16. While the upper housing portion 11 is generally circular in cross section in the area of the diaphragm 14, it is generally rectangular or square in cross section in the area where the sleeve 23 and the adjustment ring 24 are located. Since the adjustment ring 24 is also generally rectangular or square in cross section, it is prevented from rotating when it engages the wall of the housing, it will be apparent that the force exerted by the spring 26 against the diaphragm may only be adjusted by turning the ring 24, which is circular in cross section, to move on the sleeve 23 upward or downward. For this purpose, the periphery of the sleeve is notched to allow a tool (not shown), inserted through an opening 25 in the housing, to be used to adjust the compression of the spring 26.

When the pressure in the space 19 supplied by line 18 increases, the diaphragm moves downwardly, further compressing the spring 26 and moving the rod 17 downwardly. The spring 26 provides a return force when the pressure is reduced. Because part of the housing portion 11 below the diaphragm is not airtight, it is not usually necessary to provide vent openings in the housing.

Figure 4:
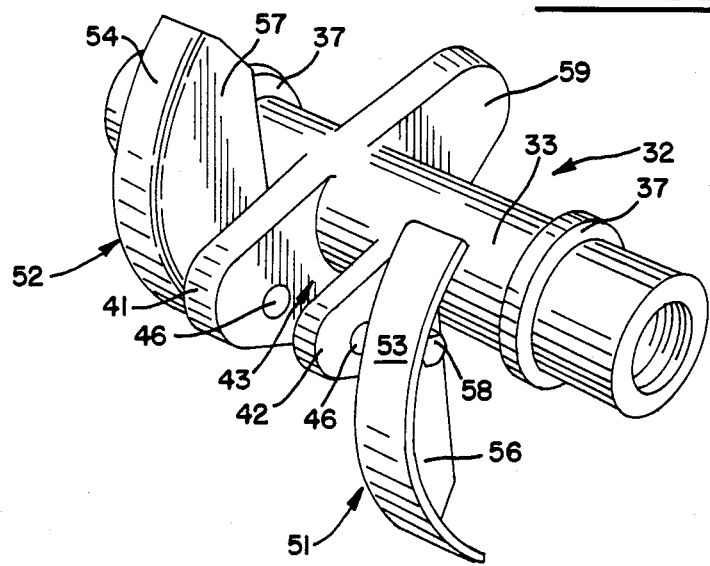
FIG. 4 is an enlarged perspective view of a lever of the apparatus.
Figure 5:
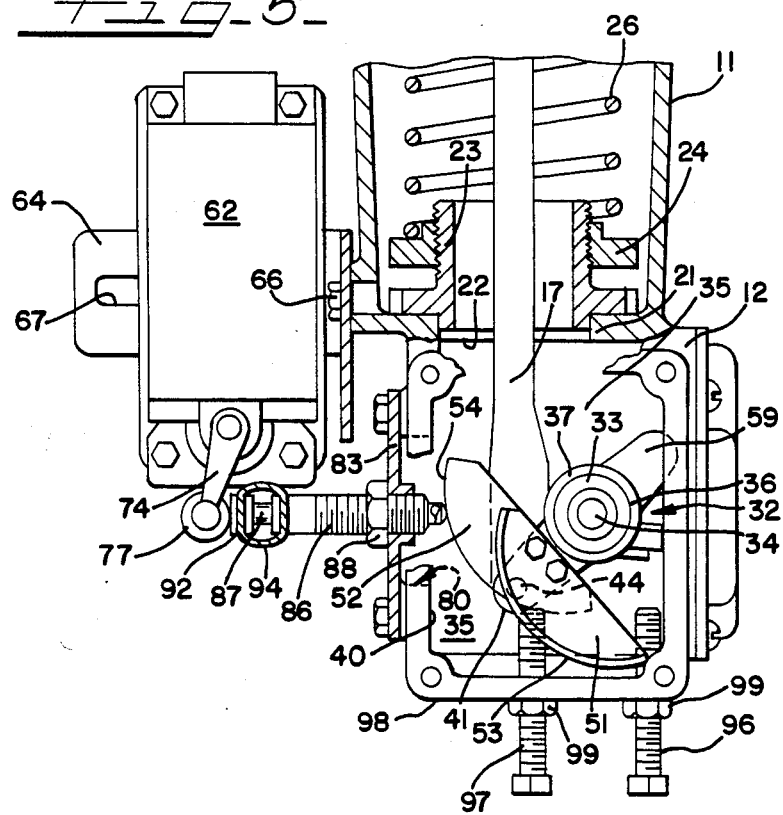
FIG. 5 is a fragmentary sectional view similar to FIG. 1 but showing different positions of the parts.

The lower end 31 of the rod 17 is pivotably connected to a lever 32 rotatably mounted in the lower housing portion 12 (see FIGS. 1, 4 and 5). The lever 32 comprises a tubular sleeve 33 (FIG. 4) which receives the shaft 34 (FIG. 2) of the valve through an opening in the wall of the lower housing portion, the sleeve having an adjustable spline connection (not shown) for accommodating valve shafts of different diameters. The shaft 34 and the sleeve 33 extend generally transversely of the rod 17 and are below the rod.

Figure 2:
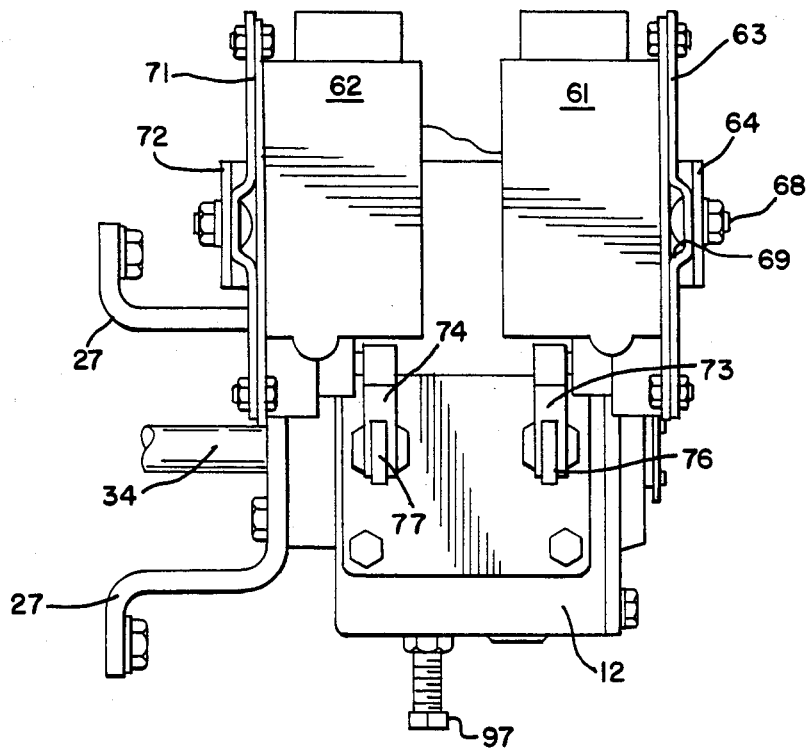
FIG. 2 is a fragmentary side elevational view of the apparatus.
Figure 3:
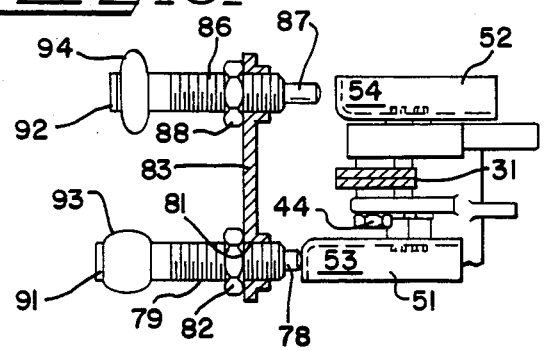
FIG. 3 is a fragmentary view of part of the apparatus.

Bearings 36 mount the sleeve part 33 for rotational movement on the housing. With reference to FIGS. 1 and 4, one of the bearings 36 is mounted on the back wall 35 and the other bearing is mounted on a removable cover (not shown) which normally closes an opening 40 of the lower housing portion 12. Flanges 37 of the lever 32 limit the amount of axial movement of the lever. As shown in FIG. 2, one end of the valve shaft 34 extends into the sleeve 33 through a hole in the housing. The valve (not shown) may be a conventional rotary valve having at least one position of interest for indication purposes, such as the full open position, but normally the valve will also have a second position of interest to the operator, such as the full closed position. Such a rotary valve usually has 90° or less of angular movement between its full open and full closed positions. A bracket 27 (FIG. 2) is secured to the housing 10 for the purpose of mounting the housing 10 on a support (not shown) adjacent the valve.

With reference to FIG. 4, the lever 32 includes two arms 41 and 42 which extend radially from the axis of the sleeve 33. The arms 41 and 42 define a space 43 between them, and the lower end of the rod 17 extends into the space 43. A pin 44 (FIGS. 1, 3 and 5) extends through holes 46 provided in the arms 41 and 42 and through a hole (not shown) in the lower end of the rod 17 to pivotably attach the rod to the sleeve 33. Since the diaphragm plate 16 resides against, but is not fixed to, the diaphragm 14, the rod 17 may pivot slightly at the plate 16 as the arms 41 and 42 move in an arc when the sleeve 33 rotates.

Mounted on the outer sides of the two arms 41 and 42 are two cams 51 and 52. The cams include arcuate outer cam surfaces 53 and 54 and mounting flanges 56 and 57. The flange 56 of the cam 51 is fastened by screws 58 to the outer side of the arm 42, and the flange 57 of the cam 52 is similarly fastened to the arm 41.

As best shown in FIGS. 1 and 5, the cam 51 is mounted on the arm 42 such that the radius of the cam surface 53 rises or increases in the counterclockwise direction. The radius of the other cam surface 54 on the other hand increases in the clockwise direction. The two cams are on essentially the same side of the sleeve 33, and the cam surfaces extend in opposite directions from the arms 41 and 42.

As will be described later, the arm 41 also forms a stop (see FIG. 5). Extending from the sleeve 33 on the opposite side from the arm 41 is another arm 59 which also forms a stop (see FIG. 1).

The cams 51 and 52 serve to actuate lever operated switches 61 and 62, shown in FIGS. 1, 2 and 5, which are mounted on the side of the housing 10 faced by the cam surfaces 53 and 54. The switch 61 is fastened by screws to a universal mounting plate 63 which has a number of hole formats to enable the plate 63 to be connected to a variety of switch sizes and designs. The plate 63 is adjustably attached to a bracket 64 which is secured to the housing 10 by screws 66. The bracket 64 has an elongated slot 67 which extends essentially transverse to the axis of rotation of the lever 32, and a pair of screws 68 (one of which is shown in FIG. 2) fasten the bracket 64 to the plate 63. The heads of the screws are inset into a recess 69 to clear the screw heads for the switch 61. By this arrangement a variety of switches may be mounted on the bracket 63, and the position of the switch may be adjusted toward or away from the housing 10 by loosening the screws 68 and sliding it along the slot 67. The other switch 62 is similarly mounted on a plate 71 and a bracket 72.

The switches 61 and 62 include spring biased switch arms, or levers, 73 and 74, respectively, for opening and closing the switch connections, and rollers 76 and 77 are provided at the ends of the switch arms 73 and 74, respectively. The roller 76 is substantially aligned with the cam surface 53 and by virtue of the spring bias of the switch 61 holds a movable pin 78 (FIGS. 1 and 3) against the cam surface. An externally threaded tubular pin guide 79 extends through an internally threaded hole 81 in the housing, and the pin 78 slides in the guide 79 between the roller 76 and the cam surface 53. Once the guide 79 has been screwed into the hole 81, a locking nut 82 on the guide secures the guide in preselected place on the housing 10. In the example shown, the housing 10 includes an access opening 80 and a removable cover 83 for closing the opening 80. The hole 81 is formed in the cover 83.

Similarly, the other switch 62 (FIG. 5) is associated with a guide 86, a pin 87 and a lock nut 88, which are mounted between the roller 77 and the cam surface 54.

Attached to the left ends of the pins 78 and 87 are heads 91 and 92 which are engageable with the rollers 76 and 77. Flexible boots, or covers, 93 and 94 on the pin guides prevent dust and moisture from entering the guides.

At least one stop is provided to limit the degree of angular movement of the lever 32. In the present example, two stops are provided to limit the angular movement in both directions. Two cap screws 96 and 97 are screwed into threaded holes formed in the bottom wall 98 of the housing 10, and locking nuts 99 secure the screws 96 and 97 in selected positions. The screw 96 is located below the stop arm 59 of the lever 32 (see FIG. 1) and the screw 97 is located below the arm 41 of the lever 32. The lever 32 may be rotated in the clockwise direction (as seen in FIG. 1) until the stop arm 59 engages the stop screw 96, and it may be rotated in the counterclockwise direction (as seen in FIG. 5) until the arm 41 engages the other stop screw 97. It will be apparent that the extent of angular movement of the lever in one or both directions may be adjusted by screwing the stop screws 96 and 97 up or down.

Considering the overall operation of the apparatus, the shaft 34 (FIG. 2) of a mechanism (not shown) to be operated such as the shaft of a rotary valve is inserted into and secured to the sleeve 33 by a spline connection and is rotated to move the valve plug between, for example, its open and closed positions. In this specific example, the actuator responds to the control pressure supplied to the space 19 above the diaphragm 14. Depending upon the pressure above the diaphragm 14, the diaphragm will be displaced upwardly or downwardly. FIG. 1 illustrates the situation where the supply pressure is relatively low such that the compression spring 26 moves the diaphragm 14 upwardly to its uppermost position. The diaphragm 14 also moves the rod 17 upwardly, causing the lever 32 to pivot in the clockwise direction, as seen in FIG. 1, until the arm 59 engages the upper end of the stop screw 96. It will be apparent therefore that the setting of the stop screw 96 determines and the maximum angular orientation of the shaft 34 in the clockwise direction where, in this example, the valve is in the full open position.

It will also be noted that in this position the cam surface 53 engages the inner end of the pin 78 and moves the pin toward the left, as seen in FIG. 1, against the action of the spring biased switch arm 73. The head 91 of the pin 78 presses against the roller 76 and pivots the arm 73 to the point where the switch 61 is closed to activate, for example, an indicator light on a control panel. When the switch 61 is actuated and the light is operated, this is an indication that the actuator has moved the valve to its full open position.

If, on the other hand, the control pressure supplied by line 18 then increases, the added pressure in the space 19 forces the diaphragm 14 downwardly causing the spring 26 to compress and the rod 17 to move down to turn the lever 32 in the counterclockwise direction as seen in FIG. 5. The pin 78, biased inwardly by the spring biased switch arm 73, follows the cam surface 53 and moves to the right as the lever 32 turns in the counterclockwise direction, allowing the switch 61 to open as the valve moves from its full open position. Once the switch 61 is opened, the indicator light on the panel is extinguished, indicating that the valve is no longer in the full open position. When the diaphragm 14 moves downwardly to the point where the cam surface 54 engages the pin 87 associated with the other switch 62, the pin 87 is moved toward the left and the switch arm 74 of the switch 62 is pivoted. The pin 87 continues to follow the cam surface 54 until the switch 62 is closed and the arm 41 engages the other stop screw 97. When the switch 62 is closed, a second indicator light is turned on at the control panel to indicate, for example, that the valve is in its full closed position.

The foregoing example assumes that there is substantially 90° of angular movement of the valve shaft 34 and the lever 32 between the full open and the full closed positions of the valve mechanism. Assume that an apparatus according to this invention is used with a different mechanism, that there is a change in the angular positions at which full open and full closed positions occur, or that the desired points of indicator operation are some points other than full open or full closed, for example, at twenty-five percent and seventy-five percent of full open. That is, the desired points of indication are separated by less than 90° of angular movement. In any of those instances, the apparatus can be easily adjusted to provide the desired indications. More particularly, one or both of the stop screws 96 and 97 are adjusted to stop the angular movement of the lever 32 at the appropriate angular positions. For example, if the screw 96 were moved upwardly a short distance, the arm 59 would be stopped at a higher position (i.e., a position displaced counterclockwise from the position shown in FIG. 1). However, in this position the radius of the cam surface 53 at the point where it engages the inner end of the pin 78 would not therefore be as great as in the position shown in FIG. 1. Thus, to nevertheless enable the cam 51 to operate the switch 61 when the lever 32 is rotated to full clockwise location where the arm 59 is against the stop screw 96, the nut 82 is then loosened and the guide 79 is moved toward the right as seen in FIG. 1 until the pin 78 engages the cam surface 53 and is pressed to its maximum extent to the left. Then, the mounting plate 63 carrying the switch 61 is adjusted toward the right on the bracket 64 until the switch 61 is actuated (i.e., closed) by the pin 78.

Similarly, the switch 62 and its associated guide 86 and pin 87 are repositioned when the stop screw 97 is adjusted to change the angular position of the lever 32 when it is at its full counterclockwise position.

Thus, it should be apparent from the foregoing that the apparatus may be used with different mechanisms and various angular displacements in one or both directions, and that these variations may be easily accommodated by adjusting the locations of the stop screws 96 and 97, the guides 79 and 86, and the switches 61 and 62. A further advantage, as shown in FIG. 2, for example, is that the switches 61 and 62 as well as the guides 79 and 86 are all located at a central position on one side of the apparatus, so that the foregoing adjustments may easily be performed. Still further, it is not necessary to gain access to the interior of the housing to make the adjustments.

In some applications, the mechanism may have only a single position to be indicated, in which case only a single switch, guide, cam, etc. need be provided.

Figure 6:
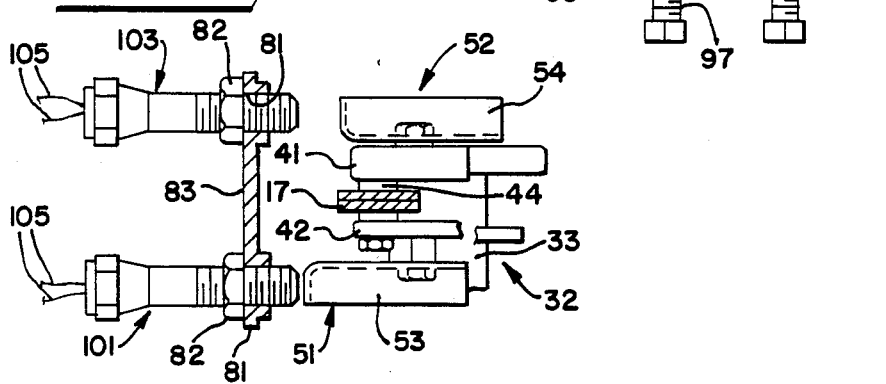
FIG. 6 is a fragmentary view similar to FIG. 3 but showing an alternative form of the apparatus.

FIG. 6 illustrates an alternative arrangement wherein a different type of cam sensor is provided. As described, the sensor shown in FIGS. 1 through 5 includes lever actuated switches and pin operating mechanisms, whereas in the arrangement shown in FIG. 6, proximity type sensors are provided. The lever 32 of the previously described embodiment is also used in this alternative arrangement, and like reference numerals have been used in FIG. 6 to also indicate these and other parts identical to those shown in FIGS. 1-5. However, mounted on the cover 83 of the housing are two conventional proximity type sensors 101 and 103. The outer peripheries of the two sensors are externally threaded and they are screwed into threaded holes 81 formed in the cover 83, and locking nuts 82 are provided to secure the sensors 101 and 103 in selected positions. The sensors 101 and 103 include magnetic sensing devices adjacent their right-hand ends (the ends adjacent the cam surfaces 53 and 54, respectively), and wires 105 connect the magnetic sensors with the control circuits for the indicators. The cam surfaces 53 and 54 should be made of or have a coating of a magnetic material, so that the sensors 101 and 103 respond to the presence or proximity of the cams. In the position shown in FIG. 6, the outer surface 53 of the cam 51 is closely adjacent the end of the sensor 101, causing this sensor 101 to operate its associated indicator. On the other hand, the cam 52 is displaced from sensor 103, so that the indicator associated with the sensor 103 is not operated. When the lever 32 is rotated as described in connection with FIGS. 1-5, the cam 52 approaches the end of the sensor 103 and operates it, whereas the other cam 51 moves away from sensor 101. In other respects, the operation is similar. When an adjustment is made to change the limits of angular movement of the lever 32, corresponding adjustments are easily made by loosening the locking nuts 82 and moving the sensors 101 and/or 103 either in or out of the housing.

It will be apparent from the foregoing that a novel and useful apparatus has been provided. The apparatus is responsive to a mechanism being controlled and operates indicators to show the position of the mechanism. The apparatus may be readily adjusted from one side of the apparatus in order to change the angular locations of the mechanism at which the indicators will be operated. The parts that are adjusted are located at a central position outside the housing where they are easily accessible, and an adjustment does not require replacement of any of the parts of the apparatus.

What is claimed is:

1. Position indicating apparatus for use with a movable mechanism having at least one preselected position, said apparatus comprising a lever, means mounting said lever for angular rotation on an axis, first means fastened to and rotatable with said lever and having an actuating surface, said surface having a radius which gradually increases in the circumferential direction about said axis, said lever being connectable to and angularly movable with the mechanism, position sensor means mounted adjacent said lever, said first means moving with said lever and moving to a first location relative to said sensor means when said mechanism moves said lever and is at said preselected position and actuating said sensor means when said mechanism is moved to said preselected position, means for adjustably mounting said sensor means for movement toward and away from said actuating surface, first stop means, means adjustably mounting said first stop means for movement toward and away from said lever, said stop means being engageable with said lever.

2. Apparatus according to claim 1, wherein said sensor means comprises a switch and pin means, said pin means extending between said switch and said first means and being movably mounted between said switch and said first means.

3. Apparatus according to claim 1, wherein said sensor means comprises electrical means responsive to the close proximity of said first means and adjustably mounted for movement toward and/or away from said first means.

4. Apparatus according to claim 1, and further including a rod connected to said lever for rotating said lever on said axis, said rod being connectable to said mechanism.

5. Apparatus according to claim 1, and further including a second means attached to said lever, and second sensor means mounted adjacent said lever for actuation by said second means.

6. Position indicating apparatus for use with a movable mechanism having at least one preselected position, comprising a housing, rotatable means including a lever, said lever having an axis, means mounting said lever on said housing for rotation on said axis, a shaft attached to said lever, means on said shaft for connecting said shaft to move with said mechanism, said shaft moving with said lever and said lever having a first angular location when said shaft and the mechanism are at a first position, said rotatable means further including first means on said lever, position sensor means, means for adjustably mounting said sensor means on said housing adjacent said rotatable means, said first means including an actuating surface having a radius which gradually increases in the circumferential direction about said axis, said sensor means being adjustable toward and away from said surface, and first stop means, means adjustably mounting said first stop means on said housing for engagement with said rotatable means for preventing said rotatable means from moving past said first location, said first stop means thereby defining said first angular location.

7. Apparatus according to claim 6, and further including movable link means coupled to said rotatable means for rotating said lever and said shaft upon movement of said link means.

8. Apparatus according to claim 6, and further comprising a visual indicator, and wherein said sensor means is connected to operate said indicator when said sensor means senses said surface.

9. Apparatus according to claim 6, wherein said rotatable means further includes second means on said lever, said second means having an actuating surface having a radius which gradually increases in the circumferential direction about said axis, a second position sensor means, means for adjustably mounting said second position sensor means on said housing adjacent said second means, and second stop means, means for adjustably mounting said second stop means on said housing for engagement with said rotatable means, said second means being angularly displaced from said first means.

* * * * *